March 20, 1928.  B. M. SCHAUMAN ET AL  1,662,868
VEHICLE BRAKE OPERATING MEANS
Filed Dec. 30, 1926  4 Sheets-Sheet 1
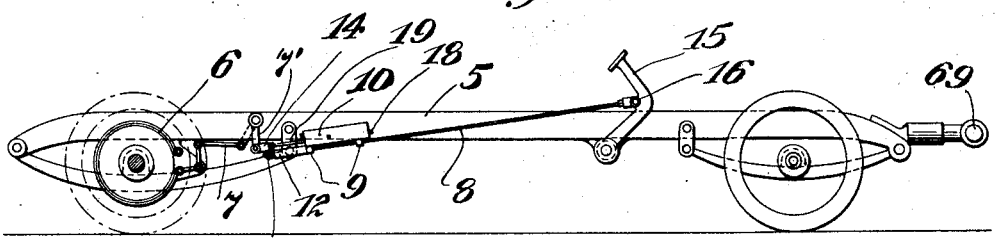
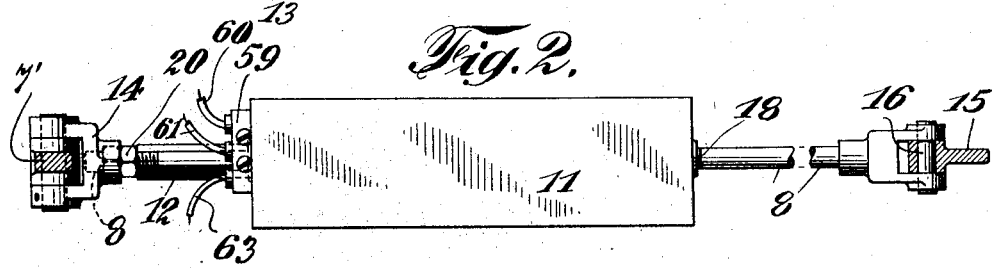
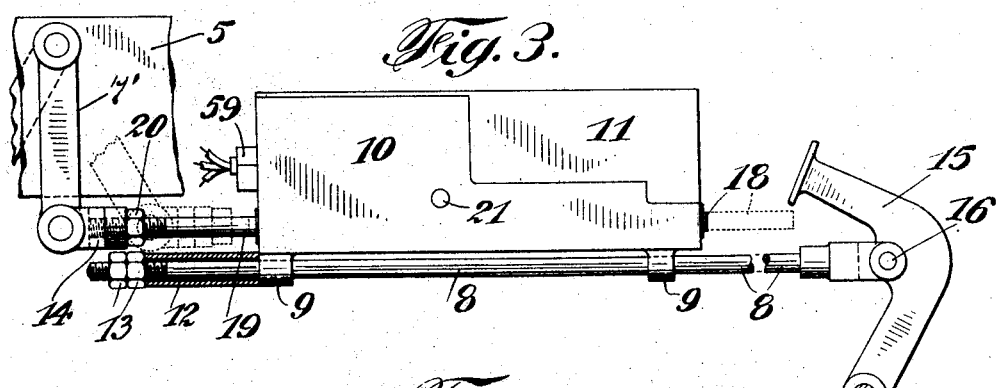
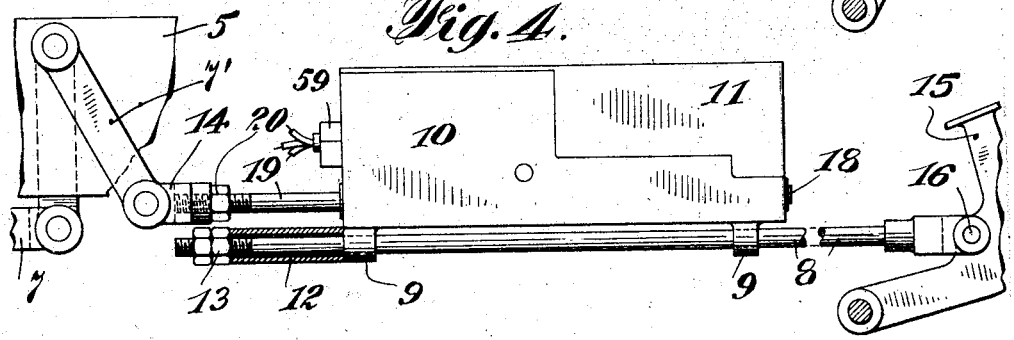
INVENTORS
Bror Max Schauman
John Francis Milligan
By C. P. Goepel
their ATTORNEY

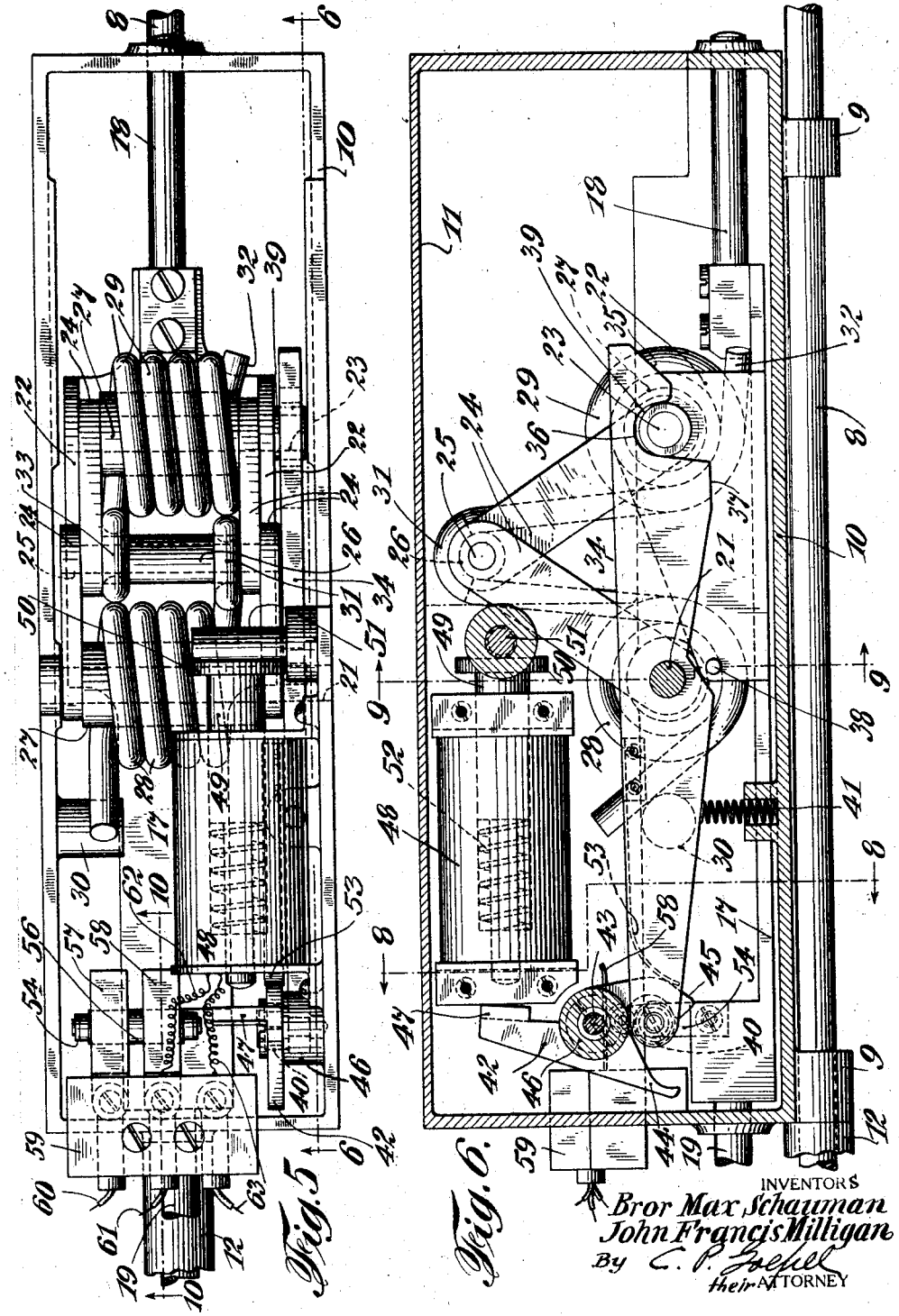

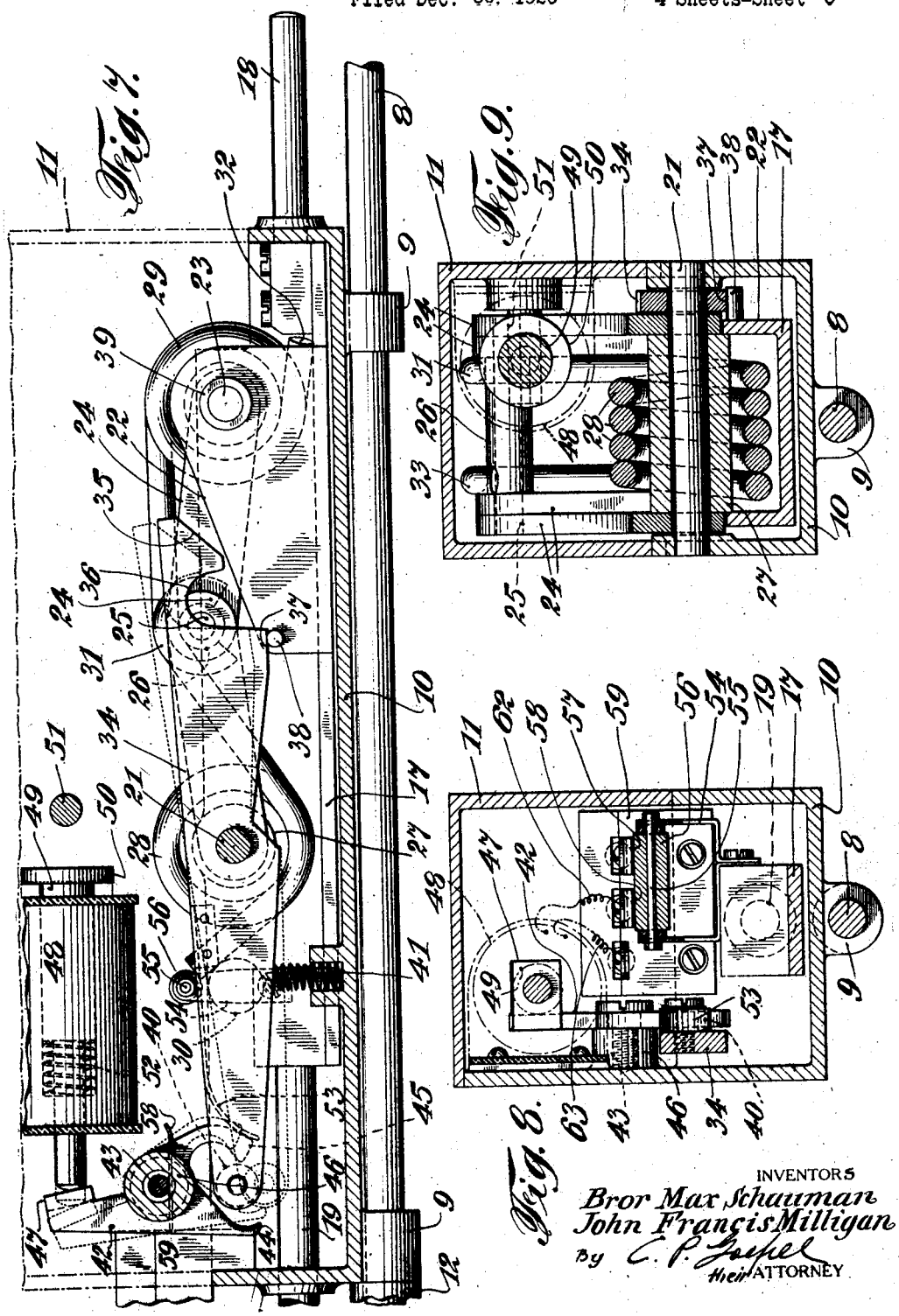

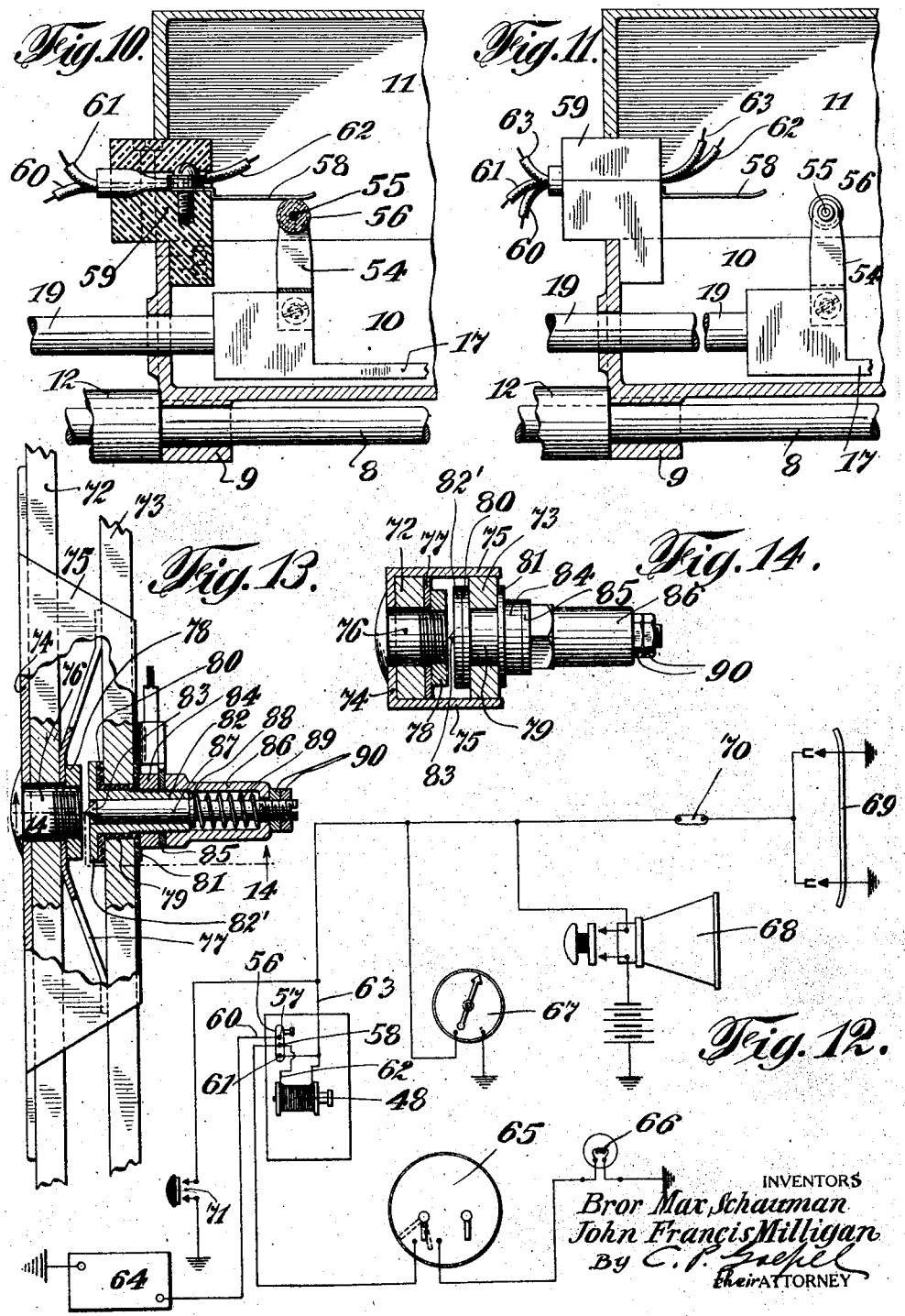

Patented Mar. 20, 1928.

1,662,868

UNITED STATES PATENT OFFICE.

BROR MAX SCHAUMAN, OF NEW YORK, N. Y., AND JOHN FRANCIS MILLIGAN, OF RIDGEFIELD PARK, NEW JERSEY, ASSIGNORS TO THORD-GRAY HOLDING CORPORATION, OF NEW YORK, N. Y., A CORPORATION OF NEW YORK.

VEHICLE BRAKE-OPERATING MEANS.

Application filed December 30, 1926. Serial No. 157,907.

This invention relates to vehicle brake operating means, and more particularly to an apparatus for automatically applying the brakes of a motor vehicle without any volitional act upon the part of the vehicle operator.

It is the primary object and purpose of our invention to simplify the construction of the apparatus and render the several cooperating parts of the mechanism more positive and reliable in functional operation and instantaneously responsive upon the closing of an electrical controlling circuit.

In a preferred embodiment of our invention, we provide parts having a relative rectilinear movement, each of which is operatively connected with a brake operating lever, one of said parts being also connected with the vehicle brakes, together with an expansible means tending to urge said parts in relatively opposite directions and a latch means normally preventing such relative movement and maintaining the expansible means in an energized condition. The latch means is operated by a solenoid magnet arranged in a control circuit which includes a suitable type of switch automatically operated by impact against the vehicle bumper to close the circuit whereupon the latch means is operated to release the expansible means and effect the automatic application of the brakes independently of the operator's lever. Also by means of suitable connections in said control circuit, the horn or other alarm device may be actuated and the circuit of the ignition system broken so that the operation of the motor is stopped.

It is one of the objects of our invention to provide an improved form and construction of the expansible operating means for the relatively movable brake actuating parts which can be housed or contained within a casing of reduced dimensions, thus enabling the apparatus to be readily applied to various types of motor vehicles within a relatively small operating space.

Our present improvements also provide a more efficient and positively operating latch construction which, though very sensitive in its action, will positively retain the expansible means in its energized condition in the normal operation of the brakes by the operator's lever and notwithstanding the severe shocks or vibrations to which the vehicle frame may be subjected.

The invention has for an additional object to provide an improved construction of an automatic switch for the control circuit which may be readily applied to numerous forms of automobile bumpers and which will instantaneously operate upon the slightest impact against the bumper to close the circuit and automatically apply the vehicle brakes.

With the above and other objects in view, the invention consists in the improved brake operating means for motor vehicles and in the form, construction and relative arrangement of its several parts as will be hereinafter more fully described, illustrated in the accompanying drawings and subsequently incorporated in the subjoined claims.

In the drawings, wherein we have disclosed one simple and practical embodiment of the invention and in which similar reference characters designate corresponding parts throughout the several views,—

Figure 1 is a side elevation of the frame or chassis of a motor vehicle illustrating one application of our present improvements;

Fig. 2 is a top plan view on an enlarged scale of the housing enclosing the parts of the brake operating mechanism and the connections with the manually operable brake lever;

Figs. 3 and 4 are enlarged side elevations showing the relative positions of the connections to the brake lever before and after the brakes are applied by said lever;

Fig. 5 is a top plan view on an enlarged scale, the upper section of the housing being removed to illustrate the operating mechanism;

Fig. 6 is a longitudinal sectional view taken substantially on the line 6—6 of Fig. 5 and showing the parts in their normal positions;

Fig. 7 is a similar view illustrating the relative positions of the parts of the mechanism after the same has operated to automatically apply the brakes;

Fig. 8 is a transverse sectional view taken substantially on the line 8—8 of Fig. 6;

Fig. 9 is a similar transverse section taken on the line 9—9 of Fig. 6;

Fig. 10 is a detail vertical section showing the circuit making and breaking device in its normal closed position;

Fig. 11 is a similar view showing the movable member of said device in its open position;

Fig. 12 is a diagrammatic view illustrating the electrical control circuit for the apparatus;

Fig. 13 is a fragmentary plan view of the vehicle bumper, certain parts being shown in section and illustrating the impact operated circuit closing switch, and Fig. 14 is a sectional view taken substantially on the line 14—14 of Fig. 13.

Referring in detail to the drawings, and more particularly to Figs. 1 to 4 thereof, for purposes of illustration, we have shown a more or less conventional form of the frame or chassis 5 of the motor vehicle. The brakes indicated at 6 for the rear vehicle wheels may also be of any customary type as well as the operating connections 7 between these brakes and a longitudinally movable rod 8. The lower section 10 of a casing or housing is provided on its bottom wall and at its oposite ends with depending apertured ears or lugs 9 through which the rod 8 is engaged. The upper section 11 of this housing may be detachably secured by any approved means upon the lower section 10. These two casing sections completely house or enclose the automatic brake applying mechanism to be hereinafter described in detail.

The rod 8 as illustrated in the drawing is a part of standard brake operating mechanism, and in the application of our invention, the connecting clevis between the rear end of this rod and the crank arm 7' of the brake operating mechanism is removed. A sleeve 12 of the proper length is then engaged over the rear end of the rod 8 and against the rear lug 9 on the housing section 10 and the nuts 13 are then threaded upon the end of rod 8 against said sleeve. This sleeve therefore, provides a stop or abutment preventing rearward movement of the casing or housing relative to the rod 8. The forward end of this rod is pivotally connected to the brake lever 15 as indicated at 16.

Within the lower section 10 of the housing a longitudinally extending plate 17 is arranged. To the forward end of this plate the rod 18 is rigidly fixed and is slidably guided in a suitable bar provided on the front end wall of the housing section 10. A similar rod 19 is also fixed to the rear end of this plate and is guided in a suitable bearing in the rear end wall of the housing section. The rear end of the latter rod is operatively connected with the arm 7' of the brake operating means by a suitable coupling member 14. The nuts indicated at 20 detachably connect this coupling member with the threaded rear end of said rod. Thus, it will be understood that the plate 17 within the housing is connected with the brake operating mechanism independently of the connections between the brake pedal 15 and said housing.

In the opposite side walls of the lower section 10 of the housing the ends of a transverse rod 21 are suitably fixed. The forward end of the plate 17 is provided with upstanding flanges 22 on its opposite longitudinal edges, and in the front ends of these flanges the ends of the transverse rod 23 are fixed. These rods 21 and 23 are positioned in the same horizontal plane. With the opposite ends of these rods, the toggle links 24 are pivotally connected, the other ends of the links in each pair being pivotally connected with each other by the pin 25, said pairs of toggle links being spaced apart at their latter ends by the spacing sleeve 26 arranged on said pin.

Upon each of the rods 21 and 23, a spacing sleeve 27 is loosely engaged between the ends of the toggle links connected therewith and each of these sleeves is surrounded by the coils of a wire spring as indicated at 28 and 29 respectively. One end of the spring 28 extends upwardly from the lower side of the coil and exerts a downward bearing pressure against the stud 30 projecting inwardly from one side wall of the housing section 10. At its other end the spring coil 28 has a relatively long end portion which terminates in a substantially semi-circular bend 31 which is engaged upon the upper side of the spacing sleeve 26 at one of its ends.

The other spring 29 has a short extension 32 at one end of the spring coil bearing upon the plate 17 and a relatively long upwardly extending end portion at the other end of the coil also terminating in the substantially semi-circular portion 33 which is engaged on the upper side of the sleeve 26 at the opposite end thereof.

Upon the transverse rod 21 adjacent one of its ends a latch lever 34 is pivotally mounted intermediate the ends thereof, said lever extending longitudinally of the housing and being provided with a reduced front end portion having an obliquely inclined cam edge 35. Adjacent to this cam edge, said latch lever is formed with a downwardly opening notch or recess 36, said lever at the rear side of the recess having a widened section extending below the recess and providing an edge 37 adapted for contact with a stop pin 38 fixed in the rear end of one of the flanges 32 on the plate 17, the purpose of which will be hereinafter explained.

One end of the rod 23 is extended beyond the outer face of the flange 22 and upon the same a collar 39 is loosely mounted with which the cam edge 35 of the latch lever is adapted to engage.

Upon the other or rear end of the latch lever 34 an anti-friction roller 40 is journaled. The latch lever is urged to the normal position shown in Fig. 6 of the drawings by a suitable spring indicated at 41 which is interposed between the lower edge of the lever and the bottom wall of the case or housing.

Upon one side wall of the lower housing section 10 at its rear end a trip member 42 is pivotally mounted as at 43 and is provided with a downwardly extending finger 44 located at the rear side of the roller 40 on the end of the latch lever and in the plane thereof. This trip member also has a second downwardly extending finger 45 at the forward side of the roller 40 and rearwardly curved beneath the same and engaged therewith as seen in Fig. 6 so as to positively lock the lever in its normal position, said rear end of the lever extending beneath the stud or projection 46 on the housing wall upon which the trip member 42 is pivotally mounted.

The trip member 42 is also formed with a part extending upwardly above its pivot and having a transversely positioned arm 47 opposed to one end of the core 49 of a solenoid 48 which is suitably mounted in the housing or casing. The other end of said core terminates in a head or flange 50 adapted to engage the pin 51 projecting from one of the side walls of the housing to limit movement of the core under the action of the spring indicated at 52.

A leaf spring 53 is fixed at one of its ends to the latch lever 34 and bears at its other free end against the front edge of the finger 45 to yieldingly hold the trip member in its normal position with said finger engaged beneath the roller 40.

To the rear end of the plate 17 an upstanding bracket 54 of any suitable construction is fixed. In this bracket a transversely positioned rod or shaft 55 is fixed and suitably insulated therefrom. On said shaft the metal roller 56 is loosely mounted. This metal roller is normally engaged with spring contact plates 57 and 58 respectively, connected with spaced binding posts mounted in an insulating block 59 suitably secured to one end wall of the lower housing section and with which the conductor wires 60 and 61 respectively, are connected, the wire 60 being connected with the positive terminal of a current supply battery while the wire 61 is connected to one pole of the usual ignition switch as will more fully appear from reference to Fig. 12 of the drawings. Contact plate 58 is also electrically connected by a suitable conductor 62 to one winding of the solenoid 48 while the other winding of said solenoid is connected by a conductor wire 63 to a switch actuated by a movable part of the bumper or other impact receiving member which will be hereinafter described in detail.

In Fig. 12 of the drawings, 64 represents the current supply battery, 65 the ignition switch, 66 the ignition coil, 67 the ammeter, 68 the horn or other signalling device and 69 the bumper or impact receiving member, all of which is customary equipment of a motor vehicle. In the conductor line 63 to the bumper switch, a manually operable switch indicated at 70 is interposed so that the circuit for the solenoid 48 may be broken to render the automatic brake applying apparatus inoperable when desired, as for instance when moving in heavy traffic and slight collision with other vehicles is more or less imminent, or in travel where brush or small trees or other obstructions might be encountered and by contact with the bumper, operate the circuit closing switch and apply the brakes. Also an additional manually operable switch indicated at 71 is connected in the conductor line 63 so that the circuit of the solenoid 48 may be closed in emergencies independently of the bumper operated switch.

While various types of switches to be operated by the bumper or other impact receiving part of the vehicle might be employed in connection with our improved brake applying mechanism, in Figs. 13 and 14 of the drawings, we have illustrated a switch construction which is applicable to a particular type of bumper which is most widely used. Bumpers of this type are provided with parallel spring steel bars 72 and 73 respectively, the rear bar 72 being rigidly fixed at its ends to the side members of the chassis or frame of the vehicle while the front impact receiving bar 73 is relatively yieldable. As shown, we provide a channel shaped metal plate or stamping 74, the intermediate body wall of which extends longitudinally along the rear face of the bumper bar 72 while the flanges 75 extend forwardly over the upper and lower edges of the bumper bars, bridging the space therebetween. This channel shaped plate is centrally fixed by means of the stud bolt 76 to the rear bumper bar 72, said bolt extending through a central opening in a leaf spring 77 which is securely clamped against the front side of the bumper bar 72 by the nut 78 threaded on said bolt. The opposite ends of this leaf spring exert a forward bearing pressure against the rear side of the front bumper bar 73.

The front bar 73 of the bumper is centrally provided with an opening to receive a fiber insulating bushing 79 having a flange 80 on one end engaged with the rear side of the bumper bar. The forward end of this bushing projects beyond the front face of the bar and receives the fiber washer 81.

A metal sleeve 82 extends through the bushing 79 and has a flange 82′ on its rear end engaged upon the flange 80 of the insulating bushing. The forwardly projecting end of said sleeve is externally threaded to receive a nut 84 which is adapted to be tightly adjusted against the fiber washer 81 and draws the sleeve through the bushing 79 to clampingly engage its flange 82′ against the bushing flange 80.

The terminal 85 for the wires 63 may be of the usual type having a metal disc or washer plate provided with a central opening to receive the outer end of the sleeve 82. An elongated cap or bonnet member 86 is then threaded upon said end of the sleeve and into clamping engagement with the terminal to bind the same tightly against the nut 84.

A pin 87 is loosely engaged in the sleeve 82 and has a pointed or tapering end 83 opposed to the end of the bolt 76 and normally extending slightly beyond the sleeve flange 82′. Intermediate of its ends this pin is provided with a shoulder 88 limiting the rearward movement of said pin through the sleeve, and a coil spring 89 surrounds said pin between said shoulder and the end wall of the cap 86 which is provided with an opening through which the outer end of the pin 87 is loosely engaged and upon which nuts 90 are threaded. It will be apparent from this construction, that when the outer bumper bar 73 receives an impact and is forced rearwardly towards the bar 72 against the action of the leaf spring 77, the end 83 of the pin 82 will first be brought into contact with the end of the bolt 76, thereby closing the circuit through the wire 63 to the ground through the bumper bar 72 and the frame of the machine. The spring 89 urging the pin 87 rearwardly provides a positive pressure of said pin against the bolt thus insuring the closing of the circuit, even though a positive contact does not result between the metal flange 82′ and the nut 78.

In the operation of the mechanism above described, it will be understood that normally the parts are in the relative positions shown in Figs. 1, 3 and 6 of the drawings wherein the expanding means for the toggle connection between the plate 17 and the housing or casing within which the mechanism is arranged is maintained in an energized condition and the said plate and housing held against a relative movement by the latch lever 34. Thus, it will be understood that the brakes 6 may be applied in the usual manner by the operation of the lever 15, as the housing and the rod 8 will move together as a unit.

Assuming that the switch 70 is closed, it will be evident that in the event of a collision, the impact against the vehicle bumper will close the circuit of the solenoid 48 by means of the switch above described from the battery 64, through the wire 60, contacts 57 and 58, roller 56 and wires 62 and 63 to the ground. Upon thus energizing the solenoid, the core 49 thereof will engage arm 47 and actuate the trigger member 42, thus moving finger 45 away from the roller 40 on the end of the latch lever and simultaneously engaging the finger 44 with said roller, thereby rocking the latch lever against the action of the spring 41 and lifting its other end to release the rod 23 from the notch 36 in said lever. The springs 28 and 29 immediately act to expand the toggle link connections 24, thereby moving the plate 17 forwardly in the housing which remains relatively stationary by reason of the stop sleeve 12. In this forward movement of the plate 17, rod 19 is also moved forwardly, and the connections 7 actuated so that the brakes are instantaneously applied. Simultaneously, the roller 56 is moved out of engagement with the two contact plates 57 and 58 and therefore, the circuit between the battery 64 and ignition switch 65 through the connection 61 is broken so that the operation of the motor is stopped. As also indicated in Fig. 12 of the drawings, if desired the armature field of the horn 68 may be connected to the conductor 63 so that when the circuit is closed by the bumper switch, the horn will be sounded.

By the action of the springs 28 and 29 through the toggle link connections between the casing and the slide member 17, an even uniform braking pressure is obtained regardless of possible variations in stroke of the rod 19 necessary to apply the brakes in the adaptation of the device to different makes of motor vehicles. Also by means of such expanding toggle mechanism, the effective braking pressure will be practically non-variable, notwithstanding wear of the brake linings, and without necessitating any relative adjustment in the parts of the mechanism.

The several parts, after operation, may be readily returned to their normal relative positions by first moving the lever 15 as in applying the brakes. Thus from reference to Fig. 3 of the drawings, it will be seen that by means of rod 8 the casing or housing within which the mechanism is contained is moved forwardly relative to the plate 17. As the collar 39 on the rod 23 contacts with the cam edge 35 on the end of the latch lever 34, said lever is raised sufficiently so that said collar may be received in the open end of the notch 36. Under the action of the spring 41, the forward end of the lever is moved downwardly and again engaged with said collar. It will of course, be understood that these springs 28 and 29 are again placed under tension as the toggle links 24 move relative to each other to the position shown in Fig. 6 of the drawings. Likewise the trigger member 42 is rocked by engagement of the roller 40 with the inclined edge of the finger 44, thus returning the arm 47 to its former position with relation to the solenoid core and also engaging the finger 45 with the roller 40. Thus the lever 34 will be securely held in its latching position so that it will not be moved to release the toggle expanding means by shock or vibration to which the mechanism may be subjected. Pressure on brake lever 15 is then released so that the housing and the rod 8 will be moved rearwardly as a unit and thereby release the brakes. As will be noted from reference to Fig. 7 of the drawings, after the device has been operated, the forward end of the latch lever is sustained in a definite position by contact of the lower edge portion 37 thereof upon the pin 38.

From the foregoing description considered in connection with the accompanying drawings, it will be seen that we have provided a very simple and compact arrangement of the several parts so that the said mechanism may be wholly enclosed within a housing or casing of relatively small dimensions, thereby enabling the device to be applied to various makes of motor vehicles in which the available space within which such a mechanism might be placed is comparatively restricted.

We have herein disclosed an embodiment of the several essential features of our present invention which have been found to be very satisfactory in practice. Nevertheless, it is possible that our present improvements might also be incorporated in various other alternative mechanical structures, and we accordingly reserve the privilege of making all such legitimate changes in the form, proportion and relative arrangement of the several elements as will be fairly considered within the spirit and scope of the invention as claimed.

We claim:

1. In combination with brake operating means including a manually operable lever, emergency means for applying the brake including relatively movable members each connected with a part of the brake operating means, a toggle connection between said members, spring means coacting with the toggle connection to expand the same and move said members relative to each other to thereby apply the brake, and a releasable latch device normally holding the spring means in an energized condition and locking said members against relative movement and for movement as a unit when the brake operating means is actuated by said lever.

2. In combination with brake operating means including a manually operable lever, emergency means for applying the brake including relatively movable members each connected with a part of the brake operating means, a toggle connection between said members, spring means coacting with the toggle connection to expand the same and move said members relative to each other to thereby apply the brake, a releasable latch device normally holding the spring means in an energized condition and locking said members against relative movement and for movement as a unit when the brake operating means is actuated by said lever, electrically controlled means for operating said latch device and a circuit therefor, and a switch in said circuit having a circuit closing element mounted upon a movable collision impact receiving part of the vehicle.

3. In combination with brake operating means including a manually operable lever, emergency means for applying the brake including relatively movable members each connected with a part of the brake operating means, a toggle connection between said members, spring means coacting with the toggle connection to expand the same and move said members relative to each other to thereby apply the brake, a releasable latch device normally holding the spring means in an energized condition and locking said members against relative movement and for movement as a unit when the brake operating means is actuated by said lever, and an actuating member for said latch device having a part cooperating with a part of the latch device to lock the latter against movement to its released position.

4. In combination with brake operating means including a manually operable lever, emergency means for applying the brake including relatively movable members each connected with a part of the brake operating means, a toggle connection between said members, spring means coacting with the toggle connection to expand the same and move said members relative to each other to thereby apply the brake, a releasable latch device normally holding the spring means in an energized condition and locking said members against relative movement and for movement as a unit when the brake operating means is actuated by said lever, an actuating member for said latch device having a part cooperating with a part of the latch device to lock the latter against movement to its released position, electrically controlled means for said actuating member and a circuit therefor, and a switch including a movable switch element actuated by an impact receiving part of the vehicle to close the circuit.

5. In combination with brake operating means including a manually operable lever, emergency means for applying the brake comprising relatively movable members each connected with a part of the brake operating means, toggle links connecting said members with each other, spring means to expand the toggle links and effect a relative movement of said members to actuate the brake applying means independently of said lever, a latch lever pivotally mounted intermediate of its ends upon one of said members and cooperating with a part on the other member to prevent relative movement of said members and hold the spring means under tension, a pivotally mounted actuating member having a finger to engage a part on said latch lever and move the same to its relative position, and said actuating member having a second finger to cooperate with said part and lock the lever against movement from its latching position in the normal unitary movement of said members by the operation of the brake lever.

6. In combination with brake operating means including a manually operable lever, emergency means for applying the brake comprising a casing connected with a part of the brake operating means, a member extending longitudinally within said casing and connected with another part of the brake operating means, a toggle link connection between said member and the casing housed within the latter, spring means to expand said toggle link connection and move said member and casing relative to each other, a latch lever pivotally mounted upon the casing and having means to co-operate with a part carried by said member to hold said spring means under tension and latch said member and casing together for unitary movement when the brake operating means is actuated by the brake lever, and an actuating member pivotally mounted upon the casing having a finger to engage a part on said latch lever and move the same to its released position whereby said member is moved by the expansible toggle means independently of the brake lever and the casing to apply the brakes, and said actuating member also having means to cooperate with said part on the latch lever and lock the latter in its latching position.

7. In combination with brake operating means including a manually operable lever, emergency means for applying the brake comprising a casing connected with a part of the brake operating means, a member extending longitudinally within said casing and connected with another part of the brake operating means, a toggle link connection between said member and the casing housed within the latter, spring means to expand said toggle link connection and move said member and casing relative to each other, a latch lever pivotally mounted upon the casing and having means to co-operate with a part carried by said member to hold said spring means under tension and latch said member and casing together for unitary movement when the brake operating means is actuated by the brake lever, an actuating member pivotally mounted upon the casing having a finger to engage a part on said lever and move the same to its released position whereby said member is moved by the expansible toggle means independently of the brake lever and the casing to apply the brakes, and said actuating member also having means to cooperate with said part on the latch lever and lock the latter in its latching position, a solenoid mounted in said casing having a core opposed to a part on said actuating member, a circuit for said solenoid, and a switch in said circuit having a movable element actuated by an impact receiving part of the vehicle to close the circuit.

8. In combination with brake operating means including a manually operable lever and a part connected therewith, emergency means for applying the brake comprising a casing connected with said part, a member longitudinally movable within said casing and connected with another part of the brake operating means, a transverse rod mounted in the opposite walls of the casing, a transverse rod mounted upon one end of said member, toggle link connections between the opposite ends of said rods, and expansion springs surrounding each of said rods and having one of its ends operatively connected with the toggle links to expand the latter and move said member relative to the casing, a latch lever pivotally mounted intermediate of its ends upon said first named rod and having means on one end to engage the other rod and hold said springs under tension, said lever normally connecting said member and the casing for movement as a unit when the brake operating means is actuated by the brake lever, and an actuating member pivotally mounted upon the casing and having a finger to engage a part on the other end of said latch lever and move the latch lever to its released position, and said member also having a second finger to coact with said part and lock said lever in its latching position.

9. In combination with a motor vehicle bumper having relatively movable front and rear bars, a switch for electrically controlled brake operating mechanism comprising a contact stud mounted in the rear bumper bar, a leaf spring interposed between the bumper bars and yieldingly resisting movement of said bars towards each other, a movable circuit closing contact member mounted in the front bumper bar and insulated therefrom and adapted for engagement with said contact stud upon impact against the front bumper bar, means for electrically connecting a conductor terminal with said movable contact member, and a spring yieldingly resisting movement of said contact member relative to the bumper bar.

10. In combination with a motor vehicle bumper having relatively movable front and rear bars, a switch for electrically controlled brake operating mechanism comprising a contact member mounted in the rear bumper bar, a leaf spring extending longitudinally between said bars and yieldingly resisting movement of the front bumper bar under impact, a circuit closing member mounted in the front bumper bar for engagement with said contact member on the rear bumper bar, means for connecting a conductor terminal with said circuit closing member, and a channel shaped plate fixed to the rear bumper bar having upper and lower flanges bridging the space between said bars at the point of engagement between said circuit closing member and the contact member.

11. In combination with a motor vehicle bumper having relatively movable front and rear bars, a switch for electrically controlled brake operating mechanism comprising a contact member mounted in the rear bumper bar, a leaf spring extending longitudinally between said bars and yieldingly resisting movement of the front bumper bar under impact, a circuit closing member mounted in the front bumper bar for engagement with said contact member on the rear bumper bar, means for connecting a conductor terminal with said circuit closing member, said circuit closing member comprising a pin movably mounted in the front bumper bar and a spring coacting with said pin and yieldingly resisting movement of said pin upon contact of the same with said contact member, and a channel shaped plate fixed to the rear bumper bar having upper and lower flanges bridging the space between said bars at the point of engagement between said circuit closing member and the contact member.

12. In combination with brake operating means including a manually operable lever, emergency means for applying the brake comprising two members each connected with a part of the brake operating means and one of said members being rectilinearly movable relative to the other, spring actuated means pivotally connecting said members with each other, and a releasable latch device coacting with a part on the relatively movable member to hold the same against movement and maintain said spring actuated means in an energized condition and connecting said members for movement as a unit when the brake operating means is actuated by said lever, and means for releasing the latch device to effect the rectilinear movement of said member by the spring actuated means and said means maintaining a positive uniform application of the braking pressure.

13. In combination with the brake lever of a motor vehicle, means for transmitting movement of said lever to the brakes to apply the latter, said means including two members, means connecting said members for movement as a unit to transmit the movement of the brake lever when actuated to the brakes and including a releasable latch device, means for operating said latch device, and power means operatively connected with one of said members and automatically acting upon the operation of the latch device to released position to move one of said members relative to the other and apply the brakes independently of the brake lever.

14. In combination with the brake lever of a motor vehicle, means for transmitting movement of said lever to the brakes to apply the latter, said means including two members, means connecting said members for movement as a unit to transmit the movement of the brake lever when actuated to the brakes and including a releasable latch device, electrically controlled means for operating said latch device and a circuit therefor, a switch to close said circuit actuated to circuit closing position by a movable collision impact receiving part of the vehicle, and power means operatively connected with one of said members and automatically acting upon the operation of the latch device to released position to move one of said members relative to the other and apply the brakes independently of the brake lever.

In testimony that we claim the foregoing as our invention, we have signed our names hereto.

BROR MAX SCHAUMAN.
JOHN F. MILLIGAN.